Oct. 17, 1939.                H. A. COY                    2,176,392
                           SPLIT-HOOK SHEAVE
                          Filed Feb. 18, 1937
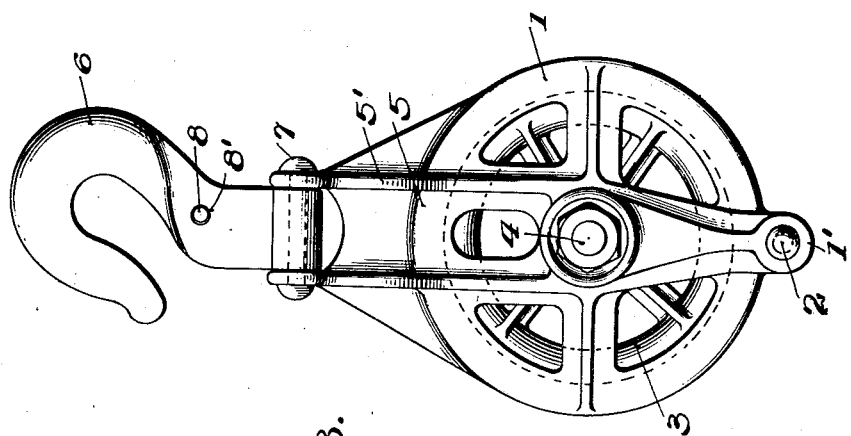
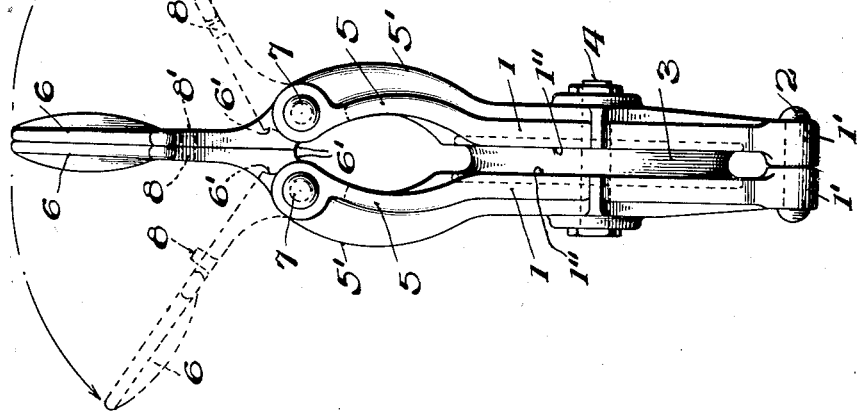
Inventor
Harley A. Coy
By Cameron, Kerkam + Sutton
                                        Attorneys Patented Oct. 17, 1939

2,176,392

UNITED STATES PATENT OFFICE 2,176,392

SPLIT-HOOK SHEAVE

Harley A. Coy, Mascot, Tenn., assignor to American Zinc, Lead & Smelting Company, St. Louis, Mo., a corporation of Maine Application February 18, 1937, Serial No. 126,463

2 Claims. (Cl. 254—193)

This invention relates to sheaves, and has for its object to provide a sheave of great strength, simple construction, with parts readily assembled and one in which a cable cooperating with the sheave may be readily placed in position and be protected from injury under rough treatment.

In many places, and particularly in mines, such sheaves are employed where they are subjected to extremely rough and heavy treatment and where stone and other abrasive particles are liable to come in contact with the cable and interfere with its smooth and efficient operation. Owing to the great strains to which these sheaves are subjected, experience has demonstrated that the sheaves should be composed of as few parts as possible, and such parts connected as rigidly as possible by means which are not liable to work loose during the rough operations to which the sheaves are subjected.

With the objects above set forth in view, the invention consists in the construction and arrangement of parts hereinafter described and shown in the accompanying drawing.

In said drawing—

Fig. 1 is an edge view of the sheave;

Fig. 2 is a side view thereof; and

Fig. 3 is a fragmentary view.

The sheave frame is composed of two substantially circular exactly similar parts 1—1, made of heavy cast steel and having at their lower edges projecting lugs 1'—1'. These lugs, 1'—1' are provided with inwardly projecting parts which, when the frame is assembled, serve to space the frame parts 1—1, and said lugs are provided with registering openings through which is passed a heavy rivet 2.

The two parts 1—1 of the frame have inwardly projecting annular flanges 1"—1" which, when the parts are assembled, serve to protect the rim portions of the pulley 3, which pulley is mounted to turn on a heavy bolt 4. At points diametrically opposite the rivet 2, each of the frame parts 1—1 is provided with two outwardly projecting portions 5—5, between which are pivoted two halves, 6—6, of a split hook the mouths or open jaws of which halves face in the same direction. The pivots for these split halves being composed of heavy rivets 7—7 passing through said outwardly projecting portions 5—5. In order to sustain the great strain to which these portions 5—5 are subjected when the pulley is in use, they are each reenforced by a rib 5'.

It is essential that the two halves 6—6 of the split hook cooperate in operation to act as a single hook in order to equally distribute the great strains on the frame of the sheave; and it is also essential that they be so constructed that, when in open position, the cable may be passed between the two parts of the hook and frame into position on the pulley 3. Furthermore, these two parts, 6—6, of the split hook must be so constructed that when in operating position the cable passing over the pulley cannot be caught between the lower parts of the split hook, and that wear on the cable by coming in contact with said parts may be avoided.

In order that these functions may be performed, the two parts of the split hook are so constructed that when they are in operative position, as shown in full lines in Fig. 1, the inner faces of the two halves of the hook are in close contact, and the two parts are brought into perfect unison by means of an inwardly projecting lug or pin 8 on the inner face of one of the parts of the split hook entering a hole or depression 8' formed in the other part of the split hook, thus insuring that the two parts of the hook shall always act as one unitary hook.

The hub portions of the two parts of the split hook are so constructed that when in closed position (Fig. 1) there is an eccentric part 6' of each hub projecting inward and so shaped that no wedge shaped space is left between them to pinch or otherwise engage the cable. When the parts of the split hook, however, are opened as shown in dotted lines in Fig. 1, the portions of the hubs immediately over the pulley 3 are so spaced that the cable may be readily passed between.

By reason of the construction thus described, there is provided a sheave of great strength, with the parts so connected that they will neither be loosened or deformed by the excessive strains to which said sheaves are subjected; the split hook equally distributes the strains to both sides of the frame, the two parts of the single hook acting as a unitary hook under the strain, while at the same time the danger of obstruction or wear of the cable by the hubs of the two parts of the split hook is avoided. Furthermore, the pulley is largely shielded from the entrance of stone and other foreign matter by reason of the inwardly projecting flanges on the sides of the frame.

Having thus described the invention, what is claimed is:

1. In a sheave, the combination of a frame composed of two oppositely disposed parts secured together and having inwardly extending annular flanges, a pulley mounted in said frame with its rim portions under said flanges, one-half of a split hook pivoted to each of the frame parts and having the mouths or open jaws of the halves facing in the same direction and the inner faces of the halves contacting when in operative position, and means fixedly adjusting the two halves of the split hook with relation to each other.

2. In a sheave, the combination of a frame composed of two oppositely disposed parts secured together, a pulley mounted between said frame parts, a split hook the two halves of which are pivoted one to each of the oppositely disposed parts of the frame to swing away from each other the mouths or open jaws of the two halves facing in the same direction and the hub portions of the halves of said split hook having eccentric portions which contact when the halves of the hook are in operative position, and a pin projecting from the inner face of one half of the split hook and entering an opening in the other half of the hook when the parts are in operative position.

HARLEY A. COY.